(12) United States Patent
Wickman et al.

(10) Patent No.: US 7,476,063 B2
(45) Date of Patent: Jan. 13, 2009

(54) THREADING TOOL, THREADING INSERT, AND METHOD OF FORMING A THREAD

(75) Inventors: Anders Wickman, Fagersta (SE); Michael Fleming, Stratford upon Avon (GB)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 11/739,702

(22) Filed: Apr. 25, 2007

(65) Prior Publication Data

US 2007/0245866 A1 Oct. 25, 2007

(30) Foreign Application Priority Data

Apr. 25, 2006 (SE) .................................. 0600904

(51) Int. Cl.
*B23B 27/16* (2006.01)
(52) U.S. Cl. ...................................... 407/113; 407/119
(58) Field of Classification Search ............... 407/24, 407/25, 26, 113, 119; 82/1.11, 110; *B23B 27/16*
See application file for complete search history.

(56) References Cited

U.S. PATENT DOCUMENTS

| 3,299,489 A | * | 1/1967 | Pohle | 407/104 |
| 5,098,232 A | * | 3/1992 | Benson | 407/33 |
| 5,712,030 A | * | 1/1998 | Goto et al. | 428/332 |
| 5,871,850 A | * | 2/1999 | Moriguchi et al. | 428/651 |
| 6,527,485 B1 | * | 3/2003 | Little | 407/24 |
| 6,702,528 B2 | * | 3/2004 | Jansson | 407/102 |
| 7,179,023 B2 | * | 2/2007 | Goudemond et al. | 407/119 |
| 2002/0112408 A1 | | 8/2002 | Rolander et al. | |
| 2004/0234349 A1 | * | 11/2004 | Ueda et al. | 407/113 |
| 2004/0258491 A1 | * | 12/2004 | Penkert | 407/113 |
| 2005/0271483 A1 | | 12/2005 | Sjogren | |

FOREIGN PATENT DOCUMENTS

| DE | 102004059777 A1 | 6/2006 |
| EP | 0264822 A2 | 4/1988 |
| JP | 03190606 A | 8/1991 |

OTHER PUBLICATIONS

International Search Report for corresponding International Application PCT/SE2007/050255.

* cited by examiner

*Primary Examiner*—Boyer D Ashley
*Assistant Examiner*—Sara Addisu
(74) *Attorney, Agent, or Firm*—WRB-IP LLP

(57) ABSTRACT

The present invention relates to a threading tool, a threading insert, and a method of forming a thread. The threading insert includes a cutting edge. The insert includes an insert supporting surface and a clamping surface for clamping the insert relative to a toolholder such that the insert supporting surface supports the insert against an abutment surface of the toolholder. At least one layer of PCBN forms a face of the insert. The cutting edge extends at least partially around a periphery of the insert and is formed in the PCBN layer.

31 Claims, 5 Drawing Sheets

THREADING TOOL, THREADING INSERT, AND METHOD OF FORMING A THREAD

BACKGROUND AND SUMMARY

The present invention relates generally to cutting inserts and, more particularly, to threading inserts having at least an entire face formed of PCBN.

"Hard turning" operations are typically considered those involving material having hardness 45 HRC and up. When manufacturing components produced in hard materials such as hardened steels and hard chilled/white cast irons (45 HRC and up) there are occasions where heavy duty thread forms are required to be machined into the components. These thread forms are Trapezoidal in shape. For purposes of the present application, "Trapezoidal" threads shall be defined as threads with 29° and 30° included angles. They may have asymmetric thread forms. Types of these thread forms include Acme, Stub Acme, ISO TR-DIN 103, Buttress, and Dardelet threads. These thread forms have a stronger thread profile than standard threads which makes them particularly useful in translational applications such as power transmission applications involving moving heavy machine loads as found on machine tools, slurry pumps etc. As the finished components are of a high hardness, there are currently two established methods employed to produce the Trapezoidal thread form.

The most common method of forming the Trapezoidal thread form is to machine the thread form while the material is in its unhardened soft state with tungsten carbide tooling. In the case of chilled/white cast iron, this can mean annealing it several times (e.g., up to 3 times) in order to make the chilled/white iron soft enough to allow tungsten carbide tooling to complete the desired thread form. Once the thread form is produced with tungsten carbide thread profile tools, the components are then heat treated to bring them up to the required hardness (up to 700 HBN). As the hardening process can induce distortion, it is common for the thread to be chased very slowly with tungsten carbide threading tools/inserts. In the case of chilled/white cast iron machining, even after triple annealing, the material is still sufficiently hard and abrasive to limit tungsten carbide tooling to slow cutting speeds (typically 50 m/min) and relatively short tools life. In addition the annealing process is costly in both time and energy costs. For both chilled/white cast iron and hard steels, the whole process is costly and time consuming and the thread form can be the major machining cost for the entire component.

Another method for forming the Trapezoidal thread form centers on a cutting tool material called Polycrystalline Cubic Boron Nitride (PCBN). PCBN is able to machine these materials in their hardened state at relatively high cutting speeds and feeds and can reduce the costs and time associated with cutting heavy duty Trapezoidal threads in hardened steel and hard chilled/white cast iron components. Being able to machine the thread directly into the hardened component allows for all annealing processes and the post thread chasing process to be eliminated from the machining cycle, thereby significantly reducing cycle times and production costs associated with producing the thread. Currently, manufacturers of PCBN Trapezoidal threading tools braze a piece of PCBN 1 or, more typically, a piece of PCBN attached to a substrate such as tungsten carbide, to a mild steel shank 2 and grind the Trapezoidal shape to the given thread form to form a PCBN brazed shank cutting tool as seen in FIGS. 1A and 1B. A braze joint 3 is disposed between the PCBN 1 and the shank 2.

The method of using a PCBN tip brazed to a mild steel shank, while offering benefits over using tungsten carbide threading inserts with the workpiece in its softened state, also has several drawbacks. These limitations relate largely to the bonding of the PCBN tip to the mild steel shank as well as to the braze joint that bonds the PCBN tip to the mild steel shank body. For example, when machining with PCBN cutting tools, heat generation is an important factor in the cutting process. Cutting speeds for brazed PCBN shank tools have to be limited in order to stop the braze joint from heating up and failing. The result is that the tool life and productivity is restricted.

Also, generally, brazed PCBN shank tools are run with coolant in order to keep the braze joint cool during machining. Running brazed PCBN shank tools without coolant has been shown to result in braze failure and therefore, catastrophic failure of the threading tool.

Because, with brazed PCBN shank tools, cutting speed is limited, the lack of heat generation when running at lower cutting speeds results in the development of a built up edge (BUE). This is when the material being cut welds to the cutting edge. This is detrimental to tool life as eventually the BUE breaks off, typically taking with it part of the cutting edge.

With brazed PCBN shank tools, the worn brazed PCBN tip is removed after each thread and datums have to be set for each new thread, which is time consuming and costly. Additionally, in brazed PCBN shank tools, cutting edges are typically produced with a tool and cutter grinding machine, which can result in a short tool life.

It is desirable to provide a cutting tool and method with which heavy duty threads can be formed in hardened materials at low cost and high speed.

According to an aspect of the present invention, a threading insert comprises a cutting edge, an insert supporting surface and a clamping surface for clamping the insert relative to a toolholder such that the insert supporting surface supports the insert against an abutment surface of the toolholder, and at least one layer of PCBN forming a face of the insert, the cutting edge extending at least partially around a periphery of the insert and being formed in the PCBN layer.

According to another aspect of the present invention, a threading tool comprises a toolholder comprising a recess, the recess comprising an abutment surface, and a threading insert receivable in the recess, the threading insert comprising a cutting edge, an insert supporting surface and a clamping surface for clamping the insert relative to the toolholder such that the insert supporting surface supports the insert against the abutment surface, and at least one layer of PCBN forming a face of the insert, the cutting edge extending at least partially around a periphery of the insert and being formed in the PCBN layer.

According to yet another aspect of the present invention, a method of threading a workpiece comprises clamping a threading insert to a toolholder with a clamp, the insert comprising an insert supporting surface and a clamping surface for clamping the insert relative to the toolholder such that the insert supporting surface supports the insert against an abutment surface of the toolholder, and at least one layer of PCBN forming a face of the insert, a cutting edge extending at least partially around a periphery of the insert and being formed in the PCBN layer. A workpiece and the insert are moved relative to each other, and the workpiece is contacted with the cutting edge.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
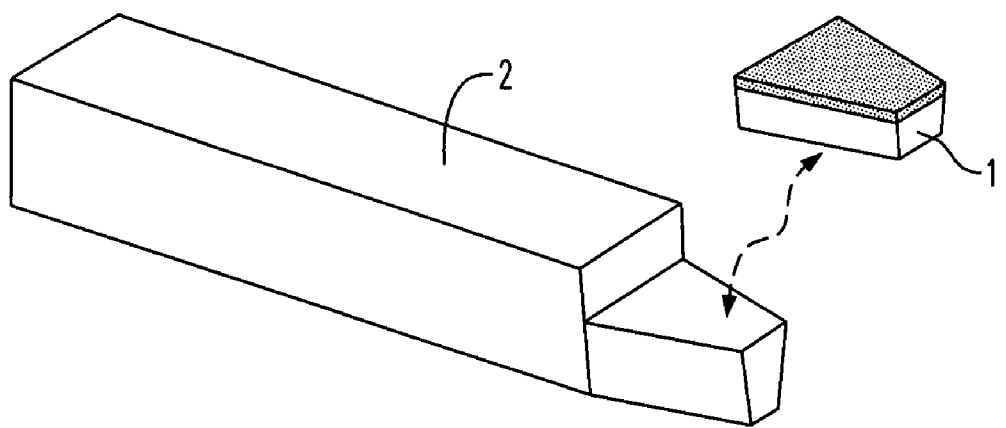
FIGS. 1A and 1B are perspective views of a prior art PCBN shank tool in an exploded and a brazed condition, respectively.
Figure 1B:
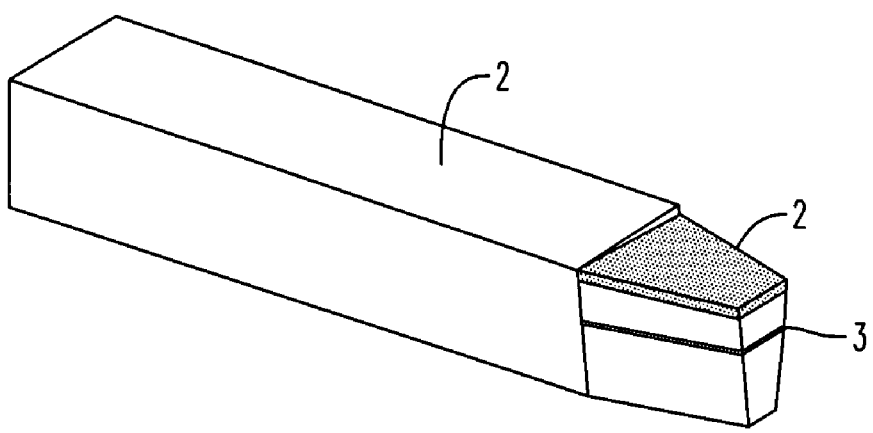
Figure 2A:
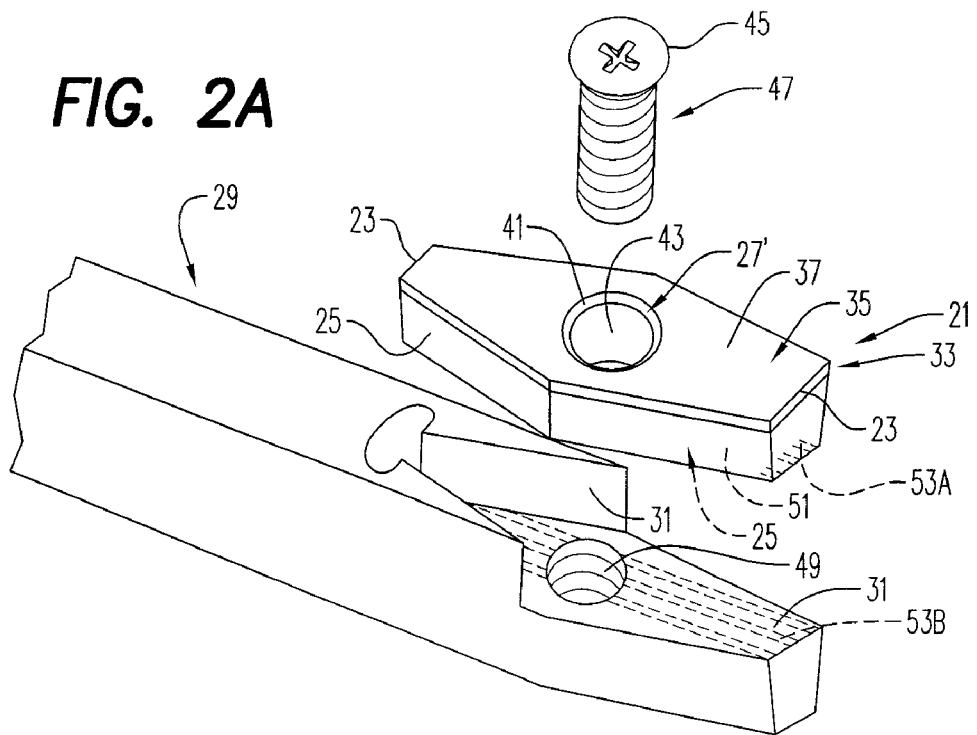
FIGS. 2A and 2B are perspective views of a PCBN shank tool according to an embodiment of the present invention in an exploded and an assembled condition, respectively.
Figure 2B:
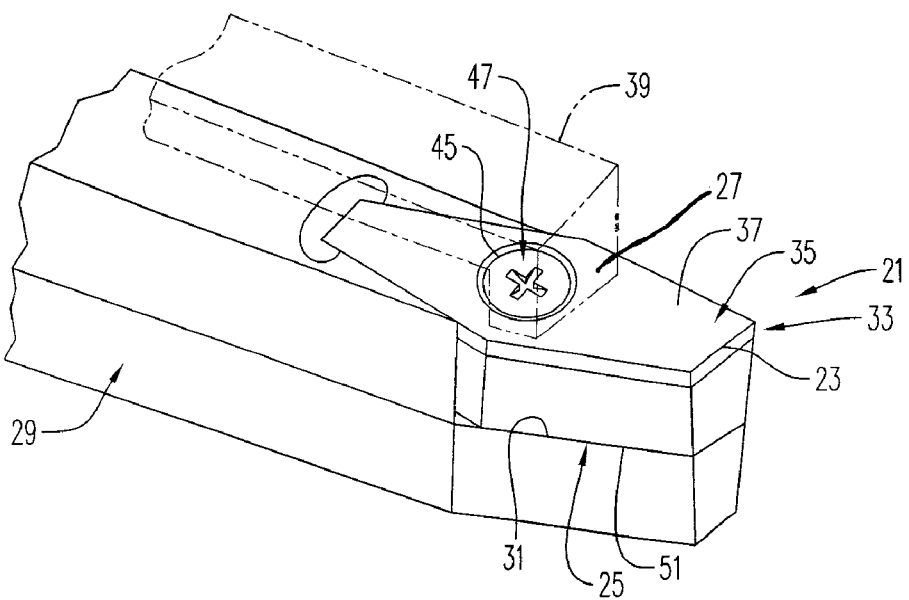

A threading insert 21 according to an embodiment of the present invention is shown in FIGS. 2A and 2B. The insert 21 includes at least one cutting edge 23. The insert 21 also includes an insert supporting surface 25 and a clamping surface 27 for clamping the insert relative to a toolholder 29 such that the insert supporting surface supports the insert against an abutment surface 31 of the toolholder. The abutment surface 31 will ordinarily be in a suitably formed recess 32 in the toolholder.

The insert 21 includes at least one layer 33 of PCBN forming a face 35 of the insert. The cutting edge 23 extends at least partially around a periphery of the insert 21 and is formed in the PCBN layer 33. Instead of merely having a layer 33 of PCBN, however, the insert 21 may be formed entirely of PCBN.

Figure 3:
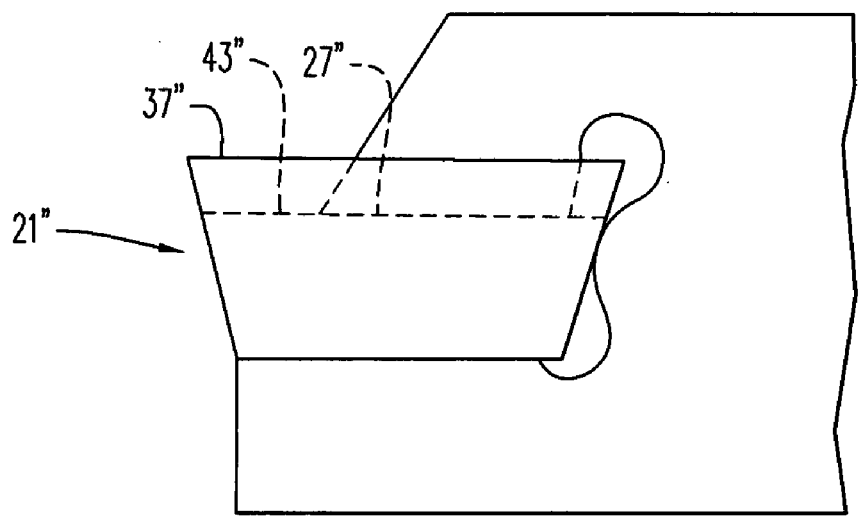
FIG. 3 is a schematic, side, partially cross-sectional view of a PCBN shank tool according to another embodiment of the present invention.
Figure 4:
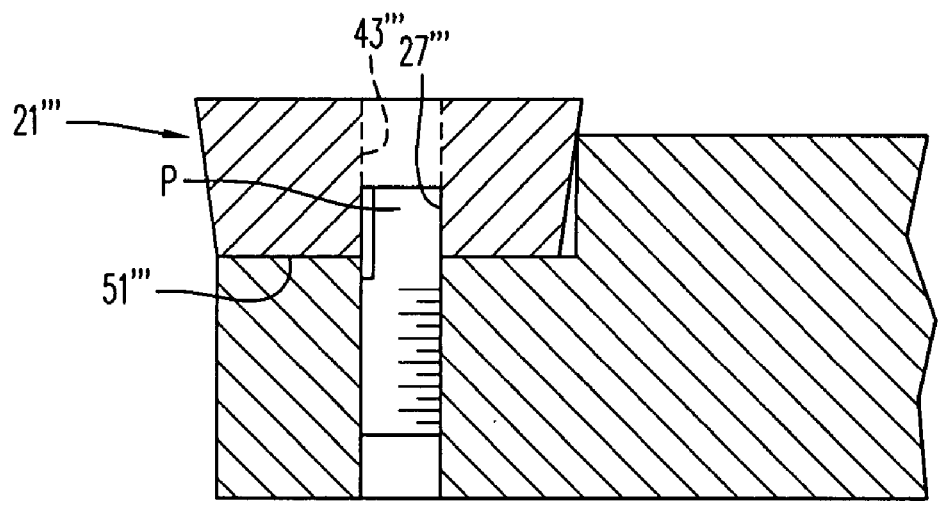
FIG. 4 is a schematic, side, partially cross-sectional view of a PCBN shank tool according to another embodiment of the present invention.

The clamping surface 27 (FIG. 2B) can be partially or entirely on a top surface 37 of the insert 21 such that a clamping arm 39 (shown in phantom in FIG. 2B) can contact the clamping surface on the top surface (or an inclined surface 41 (FIG. 2A) of a clamping hole 43 in the insert) to clamp the insert relative to the toolholder 29. Alternatively, the clamping surface 27' can be partially or entirely on an inclined surface 41 of the clamping hole 43 and the clamp can be the head 45 of a screw 47 that can be screwed into a threaded opening 49 (FIG. 2A) of the toolholder 29. In yet a different embodiment as seen in FIG. 3, the clamping surface 27" can be partially or entirely in a recess 43" extending inwardly from the top surface 37" of the insert 21" at least partially through the insert, such as is disclosed in U.S. Pat. No. 6,702, 528 and U.S. Pat. No. 6,010,281, both of which are incorporated by reference. In still another embodiment as seen in FIG. 4, the clamping surface 27''' can be partially or entirely in a hole 43''' for receiving a clamping element extending inwardly from a bottom surface 51''' of the insert 21''' at least partially through the insert for clamping by, for example, a pin P as disclosed in, for example, U.S. Pat. No. 3,299,489, which is incorporated by reference. At least one insert supporting surface 25 can comprise a pattern 53A (shown in phantom in FIG. 2A) of recessed and projecting areas corresponding to and being adapted to locate the insert relative to a pattern 53B (shown in phantom in FIG. 2B) of projecting and recessed areas on a corresponding abutment surface 31 of the toolholder 29, such as is disclosed in U.S. Pat. No. 6,244,790, which is incorporated by reference.

Figure 5:
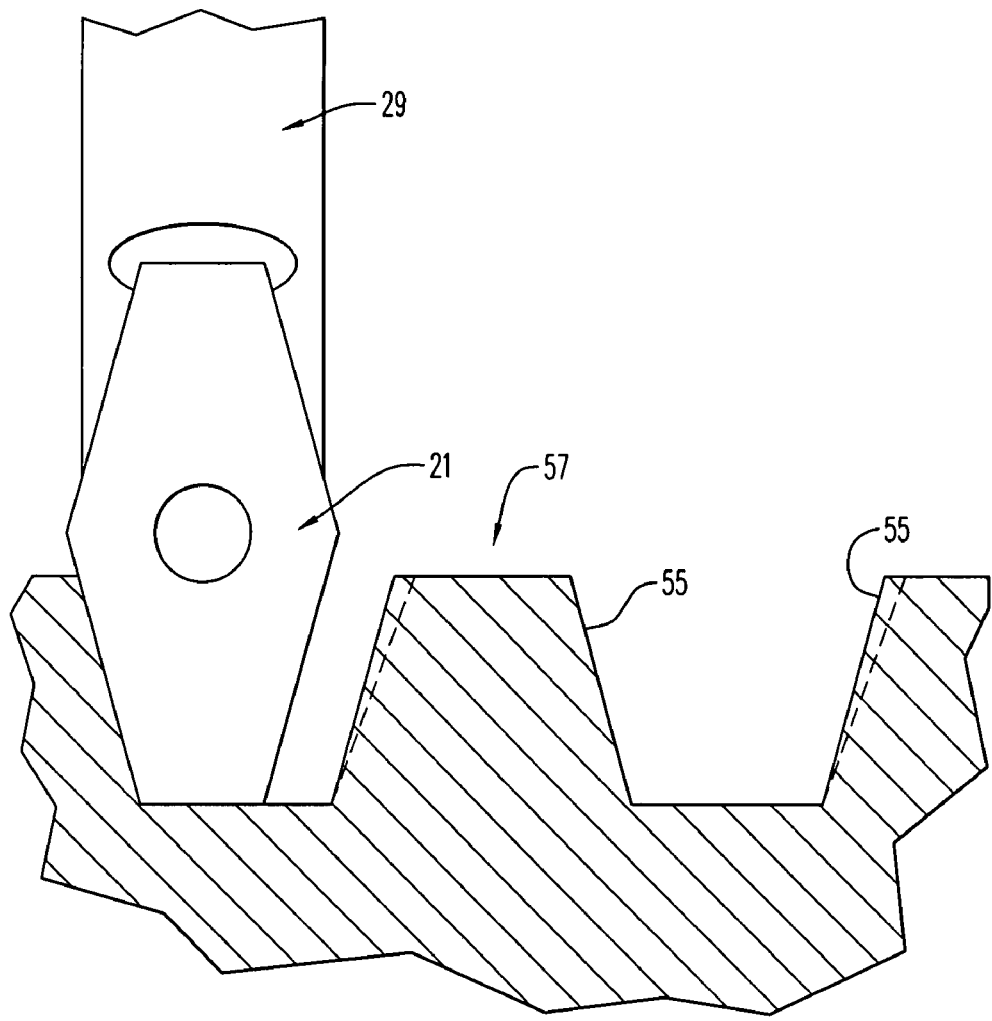
FIG. 5 is a schematic, side, partially cross-sectional view of workpiece and a PCBN shank tool according to an embodiment of the present invention.
Figure 6A:
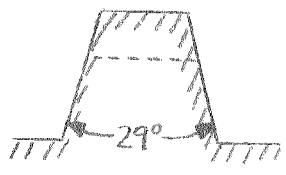
FIGS. 6A, 6B, 6C, and 6D show illustrative Acme, TR-DIN 103, Buttress, and Dardelet threads, respectively.
Figure 6B:
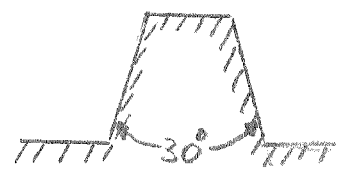
Figure 6C:
Figure 6D:
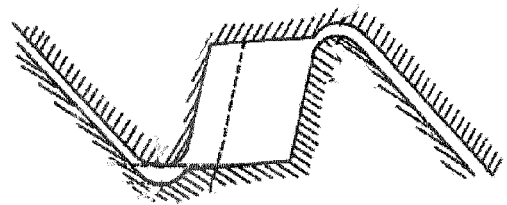

The insert 21 is preferably indexable and comprises at least two cutting edges 23 formed in the PCBN layer 33. Each cutting edge 23 can have a profile and size corresponding to a profile and size of a thread 55 to be formed, as seen in FIG. 5. The thread 55 to be formed can be a "Trapezoidal" thread, i.e., a heavy duty type thread, such as an Acme (FIG. 6A), Stub Acme (shown in phantom in FIG. 6A), TR-DIN 103 (FIG. 6B), Buttress (FIG. 6C), or Dardelet thread (FIG. 6D). "Trapezoidal" threads shall be defined as threads with 29° and 30° included angles. They may have asymmetric thread forms as shown in phantom in FIG. 5, i.e., the angle that a side of the thread forms with a longitudinal axis of the screw or bolt can be different on different sides of the thread.

The insert 21 will often have a blunt end and will typically have a length to width ratio of less than about 1.7:1, more preferably less than about 1.5:1, and still more preferably less than about 1.3:1. The PCBN of the inserts is typically obtained from a CBN200 disk. Appropriate selection of the length to width ratio, typically by selection of a smaller length to width ratio, can permit improvements in the number of PCBN inserts or PCBN insert portions that can be obtained from a disc.

The PCBN layer 33 can be laser cut or wire electro discharge machined from a master PCBN disc close to a profile and size of the thread 55 (FIG. 5) to be produced. The insert 21 can then be peripherally ground to a required final size.

In a method of threading a workpiece 57 as seen in FIG. 5, the workpiece and the insert 21 are moved relative to each other, usually by turning the workpiece about an axis. The insert 21 is clamped to a toolholder 29 with a clamp, such as a clamping arm or, as shown, a screw 47. The insert 21 comprises an insert supporting surface 25 and a clamping surface 27 for clamping the insert relative to the toolholder 29 such that the insert supporting surface supports the insert against an abutment surface 31 of the toolholder. At least one layer 33 of PCBN forms a face 35 of the insert 21, in this case the top surface 37. A cutting edge 23 extends at least partially around a periphery of the insert 21 and is formed in the PCBN layer 33. The workpiece 57 is contacted with the cutting edge 23, such as by moving the cutting edge back and forth along the axis of the workpiece to form a thread in one or more passes by moving the cutting edge closer to the axis on each pass as in conventional threading operations.

The thread 55 formed in the workpiece 57 can be a heavy duty thread, such as an Acme, Stub Acme, TR-DIN 103, Buttress, and Dardelet thread. The workpiece 57 can have a hardness greater than 45 HRC at the time of the threading operation, i.e., it is not necessary to anneal the workpiece and subsequently harden it. In addition, it will not ordinarily be necessary to chase the thread 55 after forming it because there is no distortion of the thread or the workpiece 57 due to hardening.

The workpiece 57 can be contacted with the cutting edge 23 at a higher cutting speed than a cutting speed at which the workpiece can be machined by a PCBN insert brazed to a mild steel toolholder without failure of a braze joint between the brazed insert and the mild steel toolholder. Similarly, because there is no braze joint, the workpiece 57 can be contacted with the cutting edge 23 at a higher temperature than can be achieved by machining the same workpiece using a PCBN insert brazed to a mild steel toolholder without failure of a braze joint between the brazed insert and the mild steel toolholder. In the sense used here, "failure" encompasses heat induced distortion of the braze joint, as well as breakage of the joint. The particular speeds and temperatures will vary depending upon factors such as the workpiece material being threaded, however, braze strength is typically compromised at temperatures of about 600° C. The inventors consider ideal machining parameters for machining hard materials with PCBN to involve temperatures in the range of 700° C. to 800° C. The strength of the connection between the insert and clamp according to aspects of the present invention need not be affected by temperature.

A threaded article, i.e., a workpiece 57 with threads 55, made according to the present invention can be made differently from threaded articles made according to prior art methods. Initially, the thread 55 can be formed in a hardened workpiece 57 having a hardness greater than or equal to 45 HRC. Because the workpiece 57 does not require annealing before threading and hardening and thread chasing subsequent to the threading, it may have a different metallurgical structure from those workpieces that have been annealed and hardened. The thread 55 formed can be a heavy duty thread, such as an Acme, Stub Acme, TR-DIN 103, Buttress, and Dardelet thread.

In an embodiment of a threaded article 57 according to the present invention, the thread 55 is formed by machining the hardened workpiece with a cutting edge 23 of a cutting tool comprising an insert 21 secured to a toolholder 29 with a clamp. The insert 21 comprises an insert supporting surface 25 and a clamping surface 27 for clamping the insert relative to a toolholder 29 such that the insert supporting surface supports the insert against an abutment surface 31 of the toolholder. At least one layer 33 of PCBN forms a face 35 of the insert. The cutting edge 23 extends at least partially around a periphery of the insert 21 and is formed in the PCBN layer 33. The thread 55 may be formed by contacting the workpiece 57 with the cutting edge 23 at a higher temperature than can be achieved by machining the same workpiece using a PCBN insert brazed to a mild steel toolholder without failure of a braze joint between the brazed insert and the mild steel toolholder.

The PCBN insert 21 and toolholder 29 facilitates forming a thread 55 in the workpiece 57 material in its hardened state, thereby eliminating the need for pre-threading heat treatment processes. Also, because there is no braze joint, the PCBN inserts 21 can be run at cutting speeds optimized for PCBN, which can result in a significant improvement in both tool life and productivity, as well as metallurgical differences in the threads formed in workpieces.

In addition, generally, brazed PCBN shank tools are run with coolant in order to keep the braze joint cool during machining. Running brazed PCBN without coolant has been shown to result in braze failure and therefore, catastrophic failure of the threading tool. Because the PCBN insert 21 according to the present invention does not require a braze joint, it can be run without coolant, offering a considerable saving in the cost of coolant and its disposal, and can result in metallurgical differences between workpieces threaded without the use of coolant and workpieces threaded with the use of coolant. For example, running a tool without coolant will cause higher temperatures in the workpiece that will anneal the pre-cut area workpiece which lowers the hardness value and makes the workpiece easier to shear. In addition, the lower hardness permits higher cutting speeds.

Also, with brazed PCBN shank tools, cutting speed is limited and the lack of heat generation when running at lower cutting speeds results in the development of a built up edge (BUE) where the workpiece material being cut welds to the cutting edge. This is detrimental to tool life as eventually the BUE breaks off, often taking with it part of the cutting edge. Because PCBN inserts 21 according to the present invention do not have a braze joint, they can be run at the optimised parameters for PCBN, and a BUE can be avoided.

An indexable PCBN insert 21 according to the present invention also avoids the time consuming need to reset datum after threading operations, as with brazed PCBN shank tools. With the PCBN insert 21, the toolholder 29 is fixed in the machine (not shown) preserving the machine datum. Only the insert 21 is replaced when it is worn. In addition, PCBN inserts 21 according to the present invention can be peripherally ground, which is proven to improve tool life when compared to cutting edges produced with a tool and cutter grinding machine as is the case with brazed PCBN shank tools.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in Swedish patent application No. 0600904-7, from which this application claims priority are incorporated herein by reference.

What is claimed is:

1. A threading insert, comprising a cutting edge, and wherein the insert comprises an insert supporting surface and a clamping surface for clamping the insert relative to a toolholder such that the insert supporting surface supports the insert against an abutment surface of the toolholder, and at least one layer of PCBN defining an entire face of the insert, the cutting edge extending at least partially around a periphery of the insert and being formed in the PCBN layer, the insert having a blunt end and a length-to-width ratio of less than about 1.7:1, wherein, during machining of a workpiece with the threading insert, a temperature of 700° C. to 800° C. is adapted to be generated at the cutting edge, wherein the cutting edge is defined by the blunt end and includes a first, straight edge portion and, at opposite ends of the first edge portion, two edge surfaces, each edge surface of the two edge surfaces defining an obtuse angle with the first edge portion.

2. The threading insert as set forth in claim 1, wherein the insert is formed entirely of PCBN.

3. The threading insert as set forth in claim 1, wherein the clamping surface is on a top surface of the insert.

4. The threading insert as set forth in claim 1, wherein the clamping surface is in a recess extending inwardly from a top surface of the insert at least partially through the insert.

5. The threading insert as set forth in claim 1, wherein the clamping surface is in a recess extending inwardly from a bottom surface of the insert at least partially through the insert.

6. The threading insert as set forth in claim 1, wherein at least one insert supporting surface comprises a pattern of recessed and projecting areas corresponding to and being adapted to locate the insert relative to a pattern of projecting and recessed areas on a corresponding abutment surface of the toolholder.

7. The threading insert as set forth in claim 1, wherein the insert comprises at least two cutting edges formed in the PCBN layer.

8. The threading insert as set forth in claim 1, wherein the cutting edge has a profile and size corresponding to a profile and size of a thread to be formed.

9. The threading insert as set forth in claim 1, wherein a thread to be formed by the threading insert is one of an Acme, Stub Acme, TR-DLN 103, Buttress, and Dardelet thread.

10. The threading insert as set forth in claim 1, wherein a thread to be formed by the threading insert is asymmetric.

11. The threading insert as set forth in claim 1, wherein the PCBN layer is laser cut from a master PCBN disc close to a profile and size of a thread to be produced.

12. The threading insert as set forth in claim 11, wherein the insert is peripherally ground to a required final size.

13. The threading insert as set forth in claim 1, wherein the PCBN layer is wire electro discharge machined from a master PCBN disc close to a profile and size of a thread to be produced.

14. The threading insert as set forth in claim 13, wherein the insert is peripherally ground to a required final size.

15. A threading tool, comprising:
a toolholder comprising a recess, the recess comprising an abutment surface; and
a threading insert receivable in the recess, the threading insert comprising a cutting edge, wherein the threading insert comprises an insert supporting surface and a clamping surface for clamping the insert relative to the toolholder such that the insert supporting surface supports the insert against the abutment surface, and at least one layer of PCBN defining an entire face of the insert, the cutting edge extending at least partially around a periphery of the insert and being formed in the PCBN layer, the insert having a blunt end and a length-to-width ratio of less than about 1.7:1, wherein, during machining of a workpiece with the threading tool, a temperature of 700° C. to 800° C. is adapted to be generated at the cutting edge, wherein the cutting edge is defined by the blunt end and includes a first, straight edge portion and, at opposite ends of the first edge portion, two edge surfaces, each edge surface of the two edge surfaces defining an obtuse angle with the first edge portion.

16. A threading tool as set forth in claim 15, wherein the threading tool comprises a clamp for contacting the clamping surface and clamping the insert relative to the toolholder.

17. The threading tool as set forth in claim 15, wherein the insert is formed entirely of PCBN.

18. The threading tool as set forth in claim 15, wherein the clamping surface is on a top surface of the insert.

19. The threading tool as set forth in claim 15, wherein the clamping surface is in a recess extending inwardly from a top surface of the insert at least partially through the insert.

20. The threading tool as set forth in claim 15, wherein the clamping surface is in a recess extending inwardly from a bottom surface of the insert at least partially through the insert.

21. The threading tool as set forth in claim 15, wherein at least one insert supporting surface comprises a pattern of recessed and projecting areas corresponding to and being adapted to locate the insert relative to a pattern of projecting and recessed areas on a corresponding abutment surface of the toolholder.

22. The threading tool as set forth in claim 15, wherein the insert comprises at least two cutting edges formed in the PCBN layer.

23. The threading tool as set forth in claim 15, wherein the cutting edge has a profile and size corresponding to a profile and size of a thread to be formed.

24. The threading tool as set forth in claim 15, wherein a thread to be formed is one of an Acme, Stub Acme, TR-DIN 103, Buttress, and Dardelet thread.

25. The threading tool as set forth in claim 15, wherein a thread to be formed is asymmetric.

26. A method of threading a workpiece, wherein a threading insert is clamped to a toolholder with a clamp, the insert comprising an insert supporting surface and a clamping surface for clamping the insert relative to the toolholder such that the insert supporting surface supports the insert against an abutment surface of the toolholder, and at least one layer of PCBN defining an entire face of the insert, a cutting edge extending at least partially around a periphery of the insert and being formed in the PCBN layer, the insert having a blunt end and a length-to-width ratio of less than about 1.7:1, the insert and a workpiece are moved relative to each other, and the workpiece is contacted with the cutting edge, wherein the workpiece is contacted with the cutting edge so that a temperature of 700° C. to 800° C. is generated at the cutting edge, wherein the cutting edge is defined by the blunt end and includes a first, straight edge portion and, at opposite ends of the first edge portion, two edge surfaces, each edge surface of the two edge surfaces defining an obtuse angle with the first edge portion.

27. The method as set forth in claim 26, wherein a heavy duty thread is formed in the workpiece.

28. The method as set forth in claim 27, wherein the thread formed is one of an Acme, Stub Acme, TR-DIN 103, Buttress, and Dardelet thread.

29. The method as set forth in claim 26, wherein the thread formed is asymmetric.

30. The method as set forth in claim 26, wherein the workpiece has a hardness greater than or equal to 45 HRC.

31. The method as set forth in claim 26, wherein the workpiece is contacted with the cutting edge without providing coolant during formation of the thread.

* * * * *